(No Model.)
M. H. KENAGA.
HORSE HAY RAKE.
No. 259,550. Patented June 13, 1882.
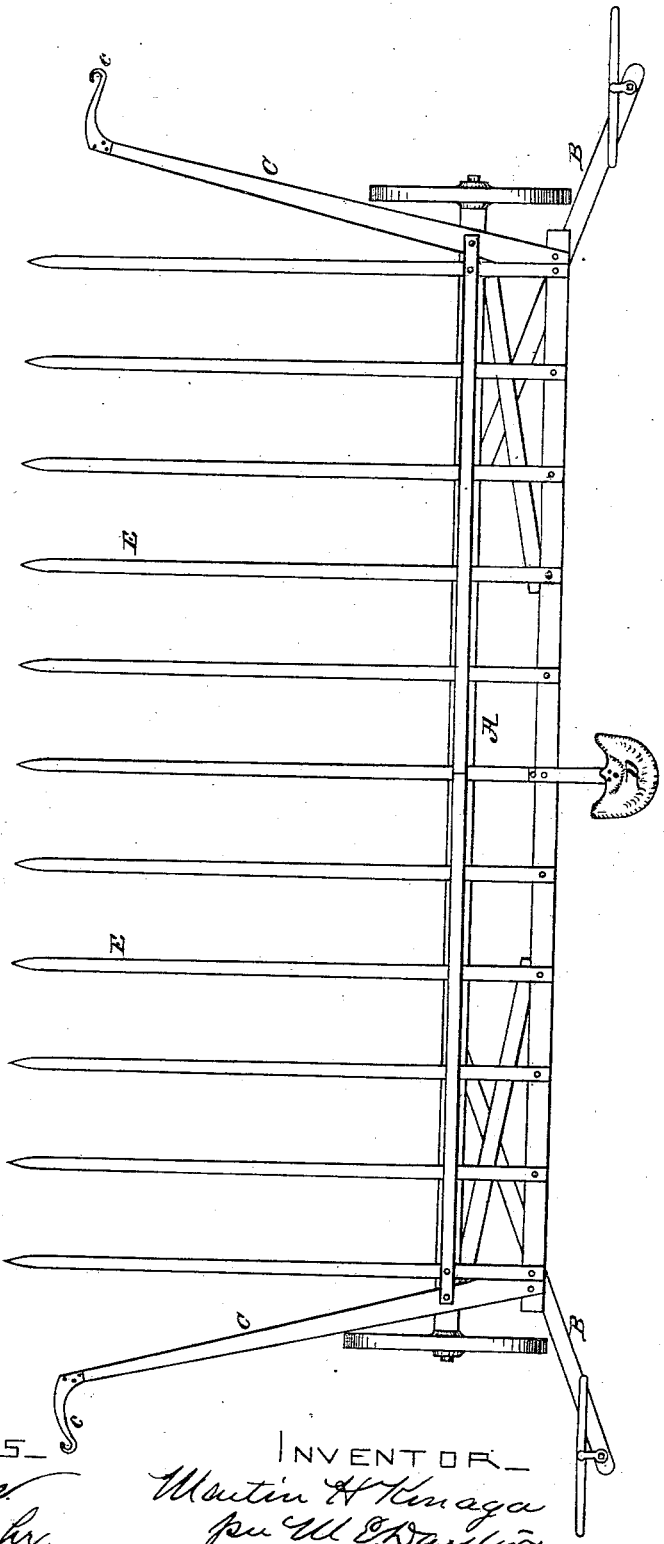

UNITED STATES PATENT OFFICE.

MARTIN H. KENAGA, OF MOMENCE, ILLINOIS.

HORSE HAY-RAKE.

SPECIFICATION forming part of Letters Patent No. 259,550, dated June 13, 1882.

Application filed March 2, 1882. (No model.)

*To all whom it may concern:*

Be it known that I, MARTIN H. KENAGA, of Momence, in the county of Kankakee and State of Illinois, have invented certain new and useful Improvements in Horse Hay-Rakes for Stackers; and I do hereby declare that the following is a full, clear, and exact description thereof, reference being had to the accompanying drawing, and to the letters of reference marked thereon, which form a part of this specification.

This invention relates to horse hay rakes or "sweeps" of the class employed in connection with stackers, and particularly to those rakes of this class which are drawn by horses hitched one at each end. Heretofore such rakes or sweeps (which are about twelve feet long) have been drawn out from beneath the load when delivered to the stacker by wheeling the horses about and drawing the rake backward. Thus managed, each horse requires a separate rider, who must be a boy not so large as to overburden the animal and yet old enough to manage the horse intelligently. The difficulty in obtaining boys of the proper age for this purpose during the haying season is found to be a practically fatal objection to this form of rake. By my invention I seek to do away with the use of riders and to enable a single man or boy to manage both horses so attached, such person being mounted on the rake or walking behind it.

To this end my invention consists in providing means at each end of the rake whereby the horses there attached may back the rake out from under its load, instead of turning around and drawing it out.

In the drawing a rake of the class referred to is shown in top or plan view and provided with my improvements.

A is the cross-head of the rake, having supporting-wheels at its opposite ends and duly trussed vertically to give requisite strength.

B B are projecting arms in the usual or any desired form, to the outer ends of which the horses are attached.

C C are stiff poles secured permanently or removably to the ends of the rake-head, and, as here arranged, directed forward, upward, and outward therefrom, so that the free front end of each is in position to allow the adjacent horse to be hitched thereto by a breast-strap.

D is a seat for the driver, supported from the rake-head and located at the rear of its axis. The horses being hitched to the projecting arms B B for draft and hitched forward to the poles C C for backing, the driver, from his position on the seat D or at a central point at the rear of the rake, may direct or back the horses with ease. By having the reins split back to a point in convenient reach he will be able to back one horse or otherwise manage him independently of the other. An iron hook, *c*, extended outward from the end of the pole C will give a hitching-point more directly in front of the horse.

If preferred, a pair of thills may be connected with each of the arms B B, in which the horse is hitched in the usual way, which construction would be the equivalent of that shown in the drawing. When thills are used, however, it will be advisable to employ the poles B, by which to hitch the horses' heads as an aid in guiding them, in which case said poles may be relatively light.

The aggregate weight of the rake-teeth E in this form of sweep is very considerable, and the driver's seat, it is found, may be located some distance at the rear of the axial support of the rake and be sustained therefrom, as shown, without the aid of any third wheel or other bearing on the ground. When the rake is loaded the weight of the driver so seated is a positive and appreciable advantage, since the load bears heavily on the front end of the rake-teeth, which slide on the ground. Carrying the driver in the position indicated on the machine described therefore positively lightens the draft on the team.

I claim as my invention—

In a horse-rake having the horses independently attached at the ends of the rake, the projecting draft-bars B B, in combination with the projecting poles C C, for hitching the horses forward, whereby they may back the rake from beneath its load, substantially as described.

In testimony that I claim the foregoing as my invention I affix my signature in presence of two witnesses.

MARTIN H. KENAGA.

Witnesses:
M. E. DAYTON,
W. C. ADAMS.